(12) United States Patent
Ukai (10) Patent No.: US 8,370,585 B2
(45) Date of Patent: Feb. 5, 2013

(54) DATA PROCESSING SYSTEM AND CACHE CONTROL METHOD

(75) Inventor: Masaki Ukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 469 days.

(21) Appl. No.: 12/633,112

(22) Filed: Dec. 8, 2009

(65) Prior Publication Data

US 2010/0088472 A1 Apr. 8, 2010

Related U.S. Application Data

(63) Continuation of application No. PCT/JP2007/062444, filed on Jun. 20, 2007.

(51) Int. Cl.
*G06F 12/02* (2006.01)

(52) U.S. Cl. .......................... 711/153; 711/129; 711/145

(58) Field of Classification Search .................. None
See application file for complete search history.

(56) References Cited

U.S. PATENT DOCUMENTS

| 5,291,442 A * | 3/1994 | Emma et al. .................. 711/120 |
| 6,289,419 B1 * | 9/2001 | Takahashi ..................... 711/141 |

FOREIGN PATENT DOCUMENTS

| JP | 04-260146 | 9/1992 |
| JP | 11-316712 | 11/1999 |
| JP | 3226557 | 8/2001 |
| JP | 2002-149489 | 5/2002 |

* cited by examiner

*Primary Examiner* — Than Nguyen
(74) *Attorney, Agent, or Firm* — Staas & Halsey LLP (57) ABSTRACT

A data processing system is provided. The data processing system includes a plurality of processors, a cache memory shared by the plurality of processors, in which memory a cache line is divided into a plurality of partial writable regions. The plurality of processors are given exclusive access rights to the partial writable region waits.

15 Claims, 8 Drawing Sheets

DATA PROCESSING SYSTEM AND CACHE CONTROL METHOD

CROSS-REFERENCE TO RELATED APPLICATION

This application is a continuation application based on International Application No. PCT/JP2007/062444, filed on Jun. 20, 2007.

FIELD

The embodiments discussed herein relate to a data processing system and cache control method.

BACKGROUND

Systems where a plurality of processor cores share a main memory, in particular, systems such as SMP (Symmetric Multi Processing) and ccNUMA (cache-coherent Nonuniform Memory Access) maintaining cache coherence, often have problems resulting in a drop in performance caused by the plurality of processor cores simultaneously competing for one cache line. One such problem, "false sharing", occurs when updating different stored words inside the same cache line.

If the unit of management (size of a cache line) of cache data is a word, there will be no competition for a cache line. However, a cache line normally handles units far larger than the size of words, so competition occurs. The same false sharing problem occurs in system controllers or memory controllers even in a cache-less system when the unit of management is larger than a word.

As a known hardware level false sharing countermeasure, there is a system that switches the cache protocol between a write invalidate scheme and a write broadcast scheme so as to control writing to a cache 12 depending on whether there is false sharing (Patent Literature 1). Further, there is known a system that keeps, for each word in a block, information on whether a word is exclusive or shared when all words in a cache block are valid and information on whether a word is valid or invalid when not all words in a cache block are valid (Patent Literature 2). However, it does not resolve false sharing.

Patent Literature 1: Japanese Laid-Open Patent Publication No. 2002-149489

Patent Literature 2: Japanese Patent No. 3226557

SUMMARY

The data processing system according to a first aspect of the embodiments includes a plurality of processors, a cache memory shared by the plurality of processors, a cache line of the cache memory divided into a plurality of partial writable regions, and a memory connected to the plurality of processors, wherein the plurality of processors are given exclusive access rights for the partial writable region units.

The cache control method according to a second aspect of the embodiments is a cache control method of a data processing system which includes a plurality of processors and a cache memory shared by the plurality of processors, a cache line of the cache memory divided into a plurality of partial writable regions, the cache control method includes, when one processor of the plurality of processors specifies a partial writable region and requests an exclusive access right, if another processor has an exclusive access right for the entire cache line or an exclusive access right for the specified partial writable region, instructing the other core to flush and invalidate the data and providing to the requesting processor an exclusive access right for the specified partial writable region.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
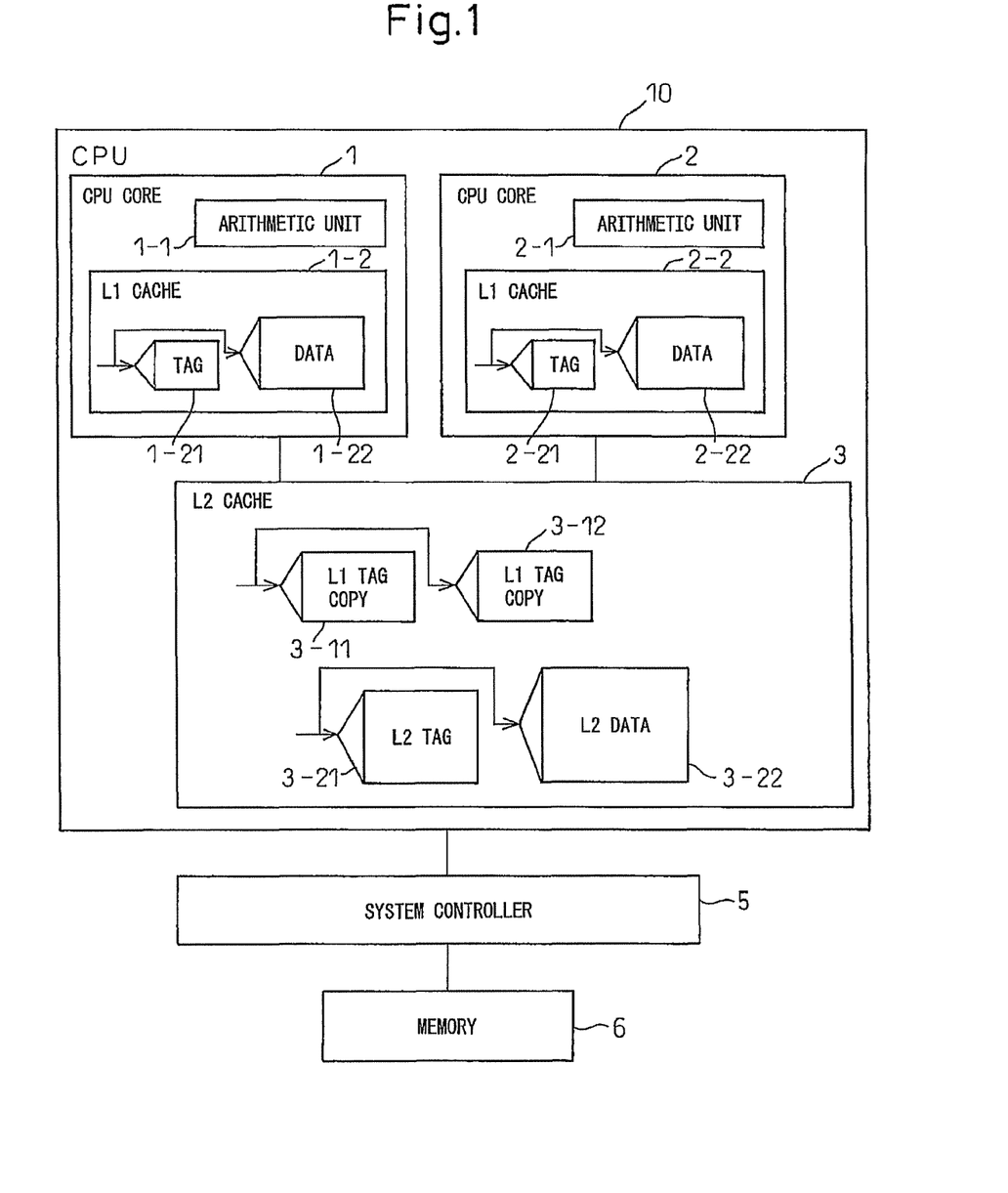
FIG. 1 is a view of a multiprocessor system to which an embodiment of the present embodiments is applied.

Below, embodiments will be explained using the drawings. FIG. 1 is a view illustrating an overview of a multiprocessor system to which a first embodiment is applied. The multiprocessor system of the present embodiment is provided with an L1 cache for each core and an L2 cache shared between the cores.

As illustrated in FIG. 1, the processor system according to the first embodiment includes a CPU (central processing unit) 10, a system controller 5 connected to the CPU 10, and a memory 6 connected to the system controller 5. Further, the CPU 10 is provided with a plurality of CPU cores 1 and 2 and a L2 (Level 2) cache 3 shared by the CPU cores 1, 2. While the CPU 10 has two CPU cores in FIG. 1, the CPU 10 may be provided with three or more CPU cores.

The CPU core 1 includes an arithmetic unit 1-1 and L1 (Level 1) cache 1-2. The L1 cache 1-2 is provided with a region storing a cache tag 1-21 and cache data 1-22. The region storing a cache tag 1-21 and cache data 1-22 is accessed at the same time by the cache index. If cached data is the data to be referred for rewriter by the arithmetic unit, the cached data is returned to the arithmetic unit.

The CPU core 2 has an identical configuration to the CPU core 1 and an arithmetic unit 2-1 and L1 cache 2-2. Further, the L1 cache 2-2 also similarly is provided with a region storing a cache tag 2-21 and cache data 2-22.

The L2 cache 3 has a tag copy 3-11 of the L1 cache 1-21 of the CPU core 1 and a tag copy 3-12 of the L1 cache 2-21 of the CPU core 2. Further the L2 cache 3 has a region storing a cache tag 3-21 and cache data 3-22 of the L2 cache itself.

The tag copies of the L1 caches are arranged so that the low order level L2 cache knows the state of the high order caches so as to secure reliability and performance. Note that, for systems without the equivalent of tag copies, it is necessary to check every time whether a tag is in a high order level cache when cache snooping. However, the embodiment may be applied to even a system without the equivalent of tag copies.

Figure 2:
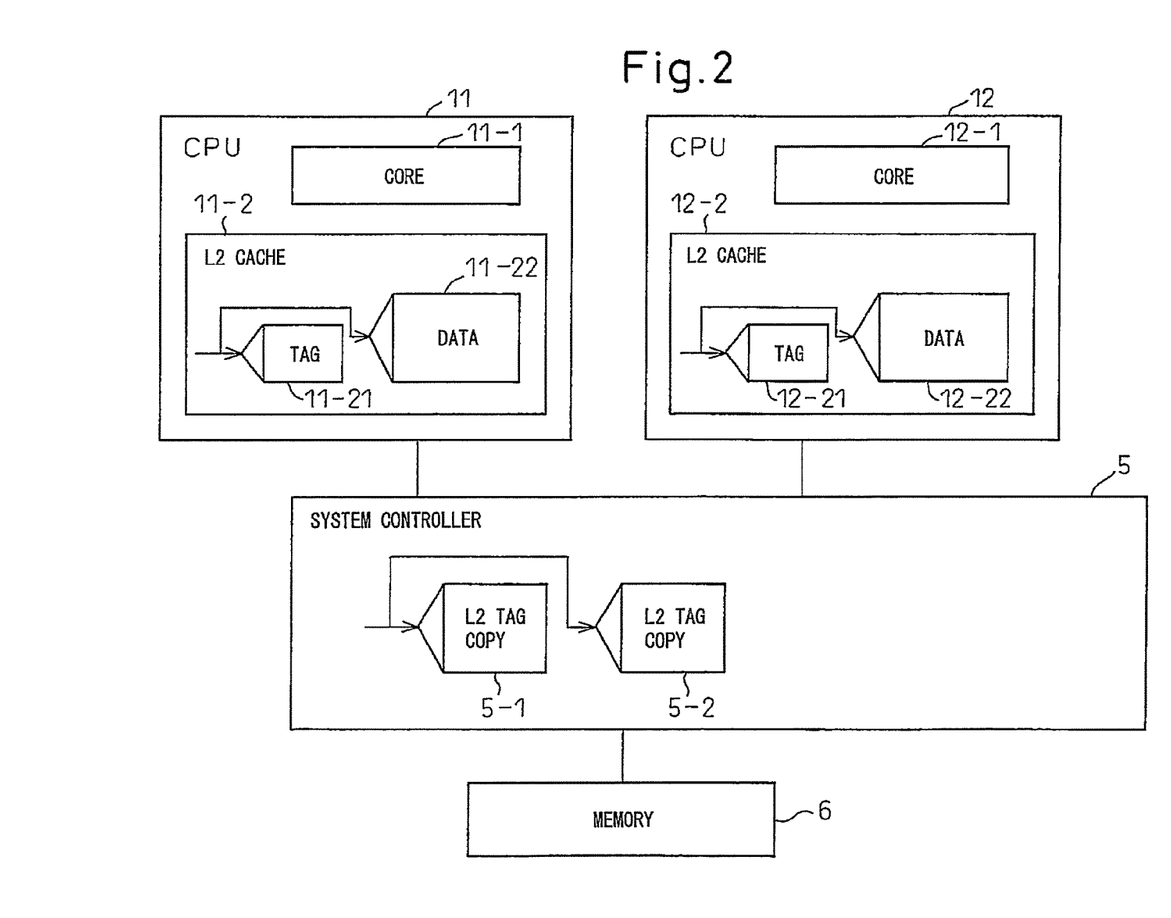
FIG. 2 is a view of another multiprocessor system to which an embodiment of the present embodiments is applied.

FIG. 2 is a view illustrating another multiprocessor to which the first embodiment is applied. FIG. 2 is a multiprocessor system provided with a plurality of CPUs. The CPUs 11 and 12 have respectively processor cores 11-1 and 12-1 and L2 caches 11-2 and 12-2. The L2 caches have regions respectively storing cache tags 11-21 and 12-21 and cache data 12-21 and 12-22.

Further, the CPUs 11 and 12 are connected to a memory 6 through a system controller 5. The system controller 5 is provided with copies of the cache tags 11-21 and 12-21 constituted by L2 tag copies 5-1 and 5-2 respectively. While FIG. 2 depicts CPUs 11 and 12, any number of CPUs may be used. The system controller 5 may be provided with a number of L2 tag copies corresponding to the number of CPUs.

In FIG. 1, L1 caches 1-2 and 2-2 are provided corresponding to the cores 1 and 2, and a L2 cache 3 is shared between the cores 1 and 2. On the other hand, in FIG. 2, the CPUs 11 and 12 are provided with L2 caches 11-2 and 12-2, and the system controller 5 is shared between the CPUs 11 and 12. That is, the system in FIG. 2 is the equivalent of one which replaces the L1 cache parts of FIG. 1 with appropriate cache level, for example, L2 caches and replaces the L2 cache of FIG. 1 with, for example, a system controller of an SMP (symmetric multiprocessor) system. The present embodiment may be applied to any system so long as it is equivalent to one provided with cache memories that different computing means use and a shared memory which the computing means use connected to the cache memories.

Figure 3:
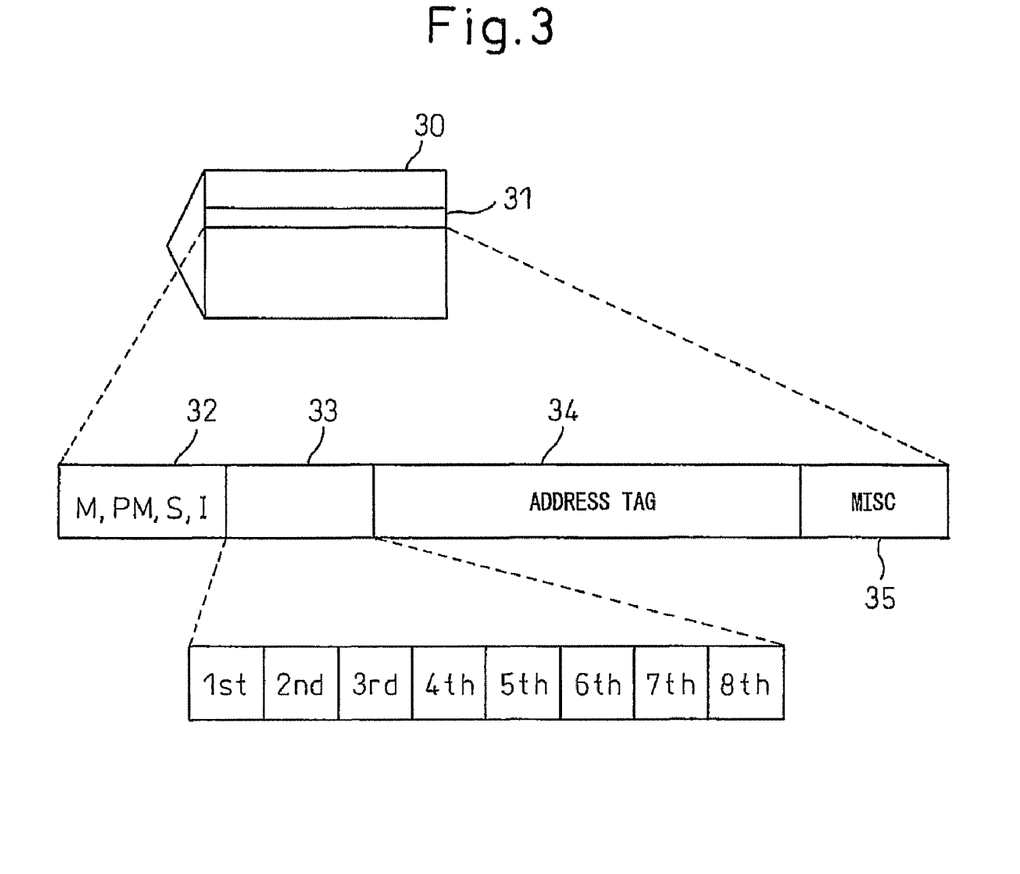
FIG. 3 is a view illustrating a cache tag of a first embodiment of the present embodiments.

FIG. 3 is a view illustrating an example of a cache tag used in the first embodiment. The present embodiment divides a cache line of an L1 cache into partial regions smaller than the cache management size and enables writing to each partial region. That is, the units for writing of the cache line are the partial regions, that is, the partial writable regions. Further, the ownership rights or update rights of the partial writable regions are exclusively given to a processor core. Therefore, the state of whether exclusive access rights are given to the partial writable regions and information of the partial writable regions are stored in the cache tag.

In the present embodiment, the unit size of the writable region is 8 bytes. This takes into consideration, when following the IEEE 754 Standard (IEEE Standard for Binary Floating-Point Arithmetic (ANSI/IEEE Std 754-1985)), the use of 4 bytes in a single precision floating point format, 8 bytes in a double precision floating point format, and further 4 bytes or 8 bytes in an integer (fixed point) format in recent processors. However, the unit size of a writable region may also be 4 bytes. By setting the unit size of the writable region as 4 bytes or 8 bytes, false sharing such as in vector operations can be almost completely eliminated in the HPC (High Performance Computing) field.

Further, in certain types of embedded image processors, so-called digital signal processors etc., there are also 1 byte size units, so the unit size of the writable region may be 1 byte. Regardless, it is sufficient to select a partial write region size for hardware or software appropriate for the hardware or software.

The cache tag 1 of FIG. 3 has address information to determine if the data in the cache is the required word in the tag entry 31 corresponding to a cache line. The address information includes high order bits not used as the cache index. In FIG. 3, the address information is stored as the address tag 34.

In the present embodiment, the tag entry 31 has a writable region block 33 to store writable region information. In the present embodiment, the writable region block 33 is divided into eight blocks. The size of each block is 8 bytes.

The cache status 32 comprises basically three states M, S, and I of M (Modified) indicating exclusivity, S (Shared) indicating shared, and I (Invalid) indicating invalid plus an additional PM (Partial Modified) indicating a partial write state If the cache status comprises a four-state MESI, that is, a three state MSI cache status 32 having an additional E (Exclusive Clean) state that is exclusive, but a data store is unexecuted, a data store unexecuted state PE (Partial Exclusive clean) for the partial writable state can be further added. Similarly, in other cache transition states, one equivalent to PM indicating a partial write state may be added.

In such a manner, in the present embodiment, the partial writable state PM indicating the presence of exclusive access rights for partial regions, and writable region information 33 indicating the position of a writable region may be registered in the cache tag. Further, according to the partial writable state PM and the writable region information 33, an ownership right or modification right for each partial writable region may be given exclusive to a processor core. Note that, an error correcting code (ECC) and the like are stored in the miscellaneous block 35.

Figure 4:
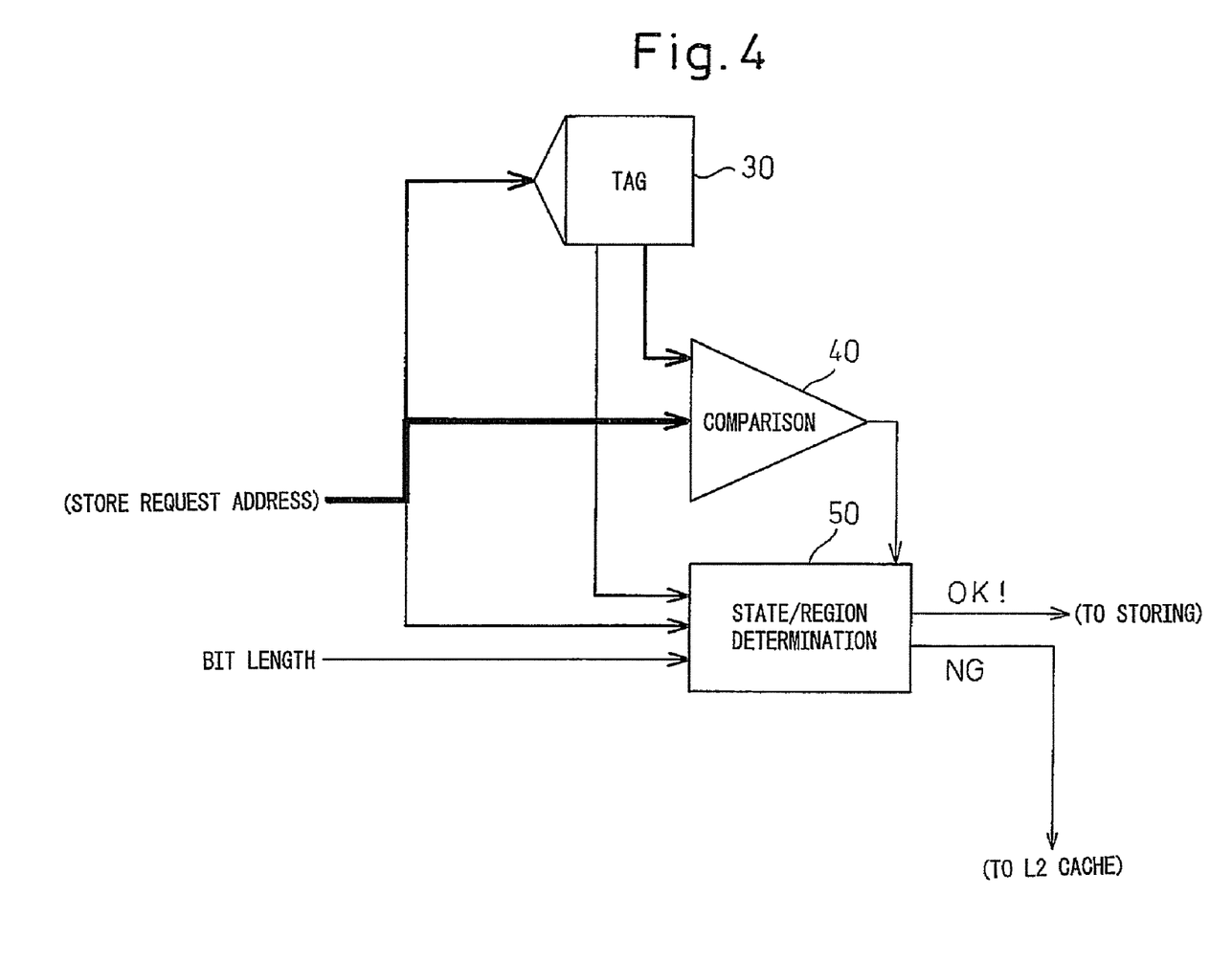
FIG. 4 is a view illustrating a circuit executing a partial write of a first embodiment of the present embodiments.

FIG. 4 is a view explaining a circuit performing processing of the present embodiment enabling setting of partial exclusive rights. When a store operation to the cache line occurs in a core, the store request address accesses the cache data (not illustrated) through the index as well as accesses the cache tag 30. The tag address gained from the tag 30 and the store request address are compared by a comparator 40. At the same time, the determination means 50 checks the tag status. If the tag status is a partial write state with a set partial exclusive right, it is determined whether a store request region matches the writable region stored in the tag. The determination means 50 determinates if the tag address and store request address match based on the output of the comparator 40. If the tag address and store request address match and the store request region and writable region match, a store operation to the cache line is executed. If not, the store request misses and is sent to the L2 cache.

To efficiently use the present embodiment, it is preferable to easily determine whether false sharing is likely to occur. In the present embodiment, in the L2 cache shared between the cores, which is at, the cache level where the tag copies are in, a state where one core has exclusivity a line due to occurrence of a normal store operation, but another core claims an exclusive right with respect to the line can be judged as "false sharing". This determination is simple and is therefore efficient. There is no apparent difference with lock competition competing for a memory word of the same address, but regardless, competition is prevented, so there is no problem.

Figure 5:
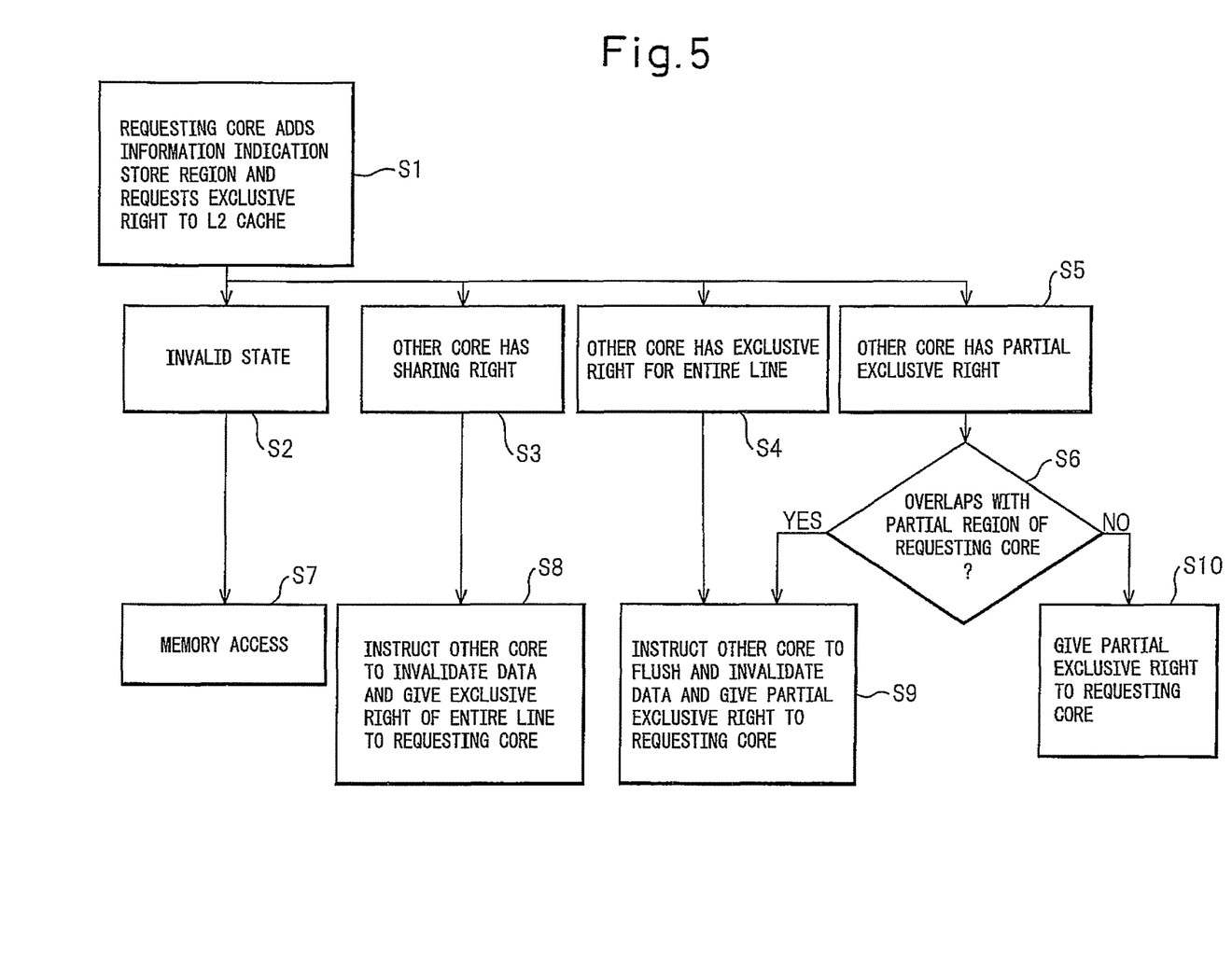
FIG. 5 is a view illustrating a flow of processing of writing of a first embodiment of the present embodiments.

FIG. 5 is a view illustrating processing when a store operation to a cache line has occurred in a processor core of the present embodiment. When a requesting core requests data with an exclusive right in the L2 cache. The requesting core passes the data request with added information indicating the partial region having the exclusive right to a L2 cache control unit (S1). When the L2 cache is accessed, there are the following four cases: the accessed block is invalid (S2), at least one other core has sharing rights (S3), another core has an exclusive right for the entire line (S4), and at least one other core has a partial exclusive right (S5).

If the accessed block is invalid (S2), the main memory must be accessed, in which case, similar to the prior art, the main memory is accessed (S7).

When there is one or more non-requesting cores having normal sharing rights to the accessed block (S3), all the non-requesting cores having sharing rights are instructed to invalidate data and give normal exclusive rights for the entire line to the requesting core (S8). However, in the present embodiment, partial exclusive rights can be given, so when false sharing is predicted to occur frequently, partial exclusive rights may be given to the requesting core.

When a non-requesting core has an exclusive right to the accessed block for the entire line (S4), the core having the exclusive right is instructed to flush and invalidate the data. Further, the requesting core requesting the exclusive right, when transferring data, is assigned a partial exclusive right for only the partial region that is indicated in the added information when making the request (S9). At the same time, the flushed data is rewritten to the L2 cache.

When at least one non-requesting core has a partial exclusive right for the accessed block (S5), all of the partial regions in which the partial exclusive state is valid are searched for in the tag copy (S6).

When there are places where the partial region of the requesting core overlaps with a region that a non-requesting core has partial exclusive right for (S6: YES), the core holding partial exclusive right for the overlapping portion is instructed to flush the data, then merge, rewrite, and invalidate the data. Further, the requesting core is given a partial exclusive right for only the partial region being added when making the request. This case is unlike false sharing in that the regions are really competing, so to simplify processing, all cores having partial exclusive rights may be instructed to flush data and merge, rewrite, and invalidate data.

When all of the partial regions requesting the exclusive right of the requesting core, i.e., the set of requested partial region, do not overlap with a region that a non-requesting core has partial exclusive right to (S6: NO). A partial exclusive access right is assigned for only a partial region being added when making the request (S10). This would be a case where false sharing has occurred if a prior art, but, in the present embodiment, it does not lead to false sharing and there is no need to send requests to the other cores.

Note that, the store command is not limited to 8 bytes and may be longer or shorter. Even when 8 bytes, there are times when the boundaries do not match, so when a store is one not contained in a writable region, in the same way as when not writable, processing to acquire the necessary exclusive right is carried out.

Further, the system does not envision the detection of states of overlap, with respect to a cache line with set partial exclusive rights, of a partial exclusive right and a conventional exclusive right for an entire line, a partial exclusive right and a sharing right, or partial regions of partial exclusive rights. Accordingly, when this state is detected by a partial writable region check or comparison, there is the risk of data corruption, so system exceptions are detected as cache state errors and system reliability is improved.

If a command specifying a store operation where false sharing is likely to occur is prepared separate from a normal store command, steps for detecting a false sharing state with hardware may be partially omitted. Thus, transition to a partial exclusive type directly enabling partial writing is possible when requesting exclusive rights originating in this command, so efficiency and reliability are further improved.

In the first embodiment, the cache tag and tag copy store the status indicating the partial writable states as well as the writable regions. If a tag is provided with the writable regions, a writable region will be provided for each tag entry, so a capacity of the writable region increases according to the number of tag entries. For example, in scientific computation, etc., there are cases where a store operation is repeated in the same writable region in a certain period and cases where providing a writable region for each cache line leads to bad efficiency.

Figure 6:
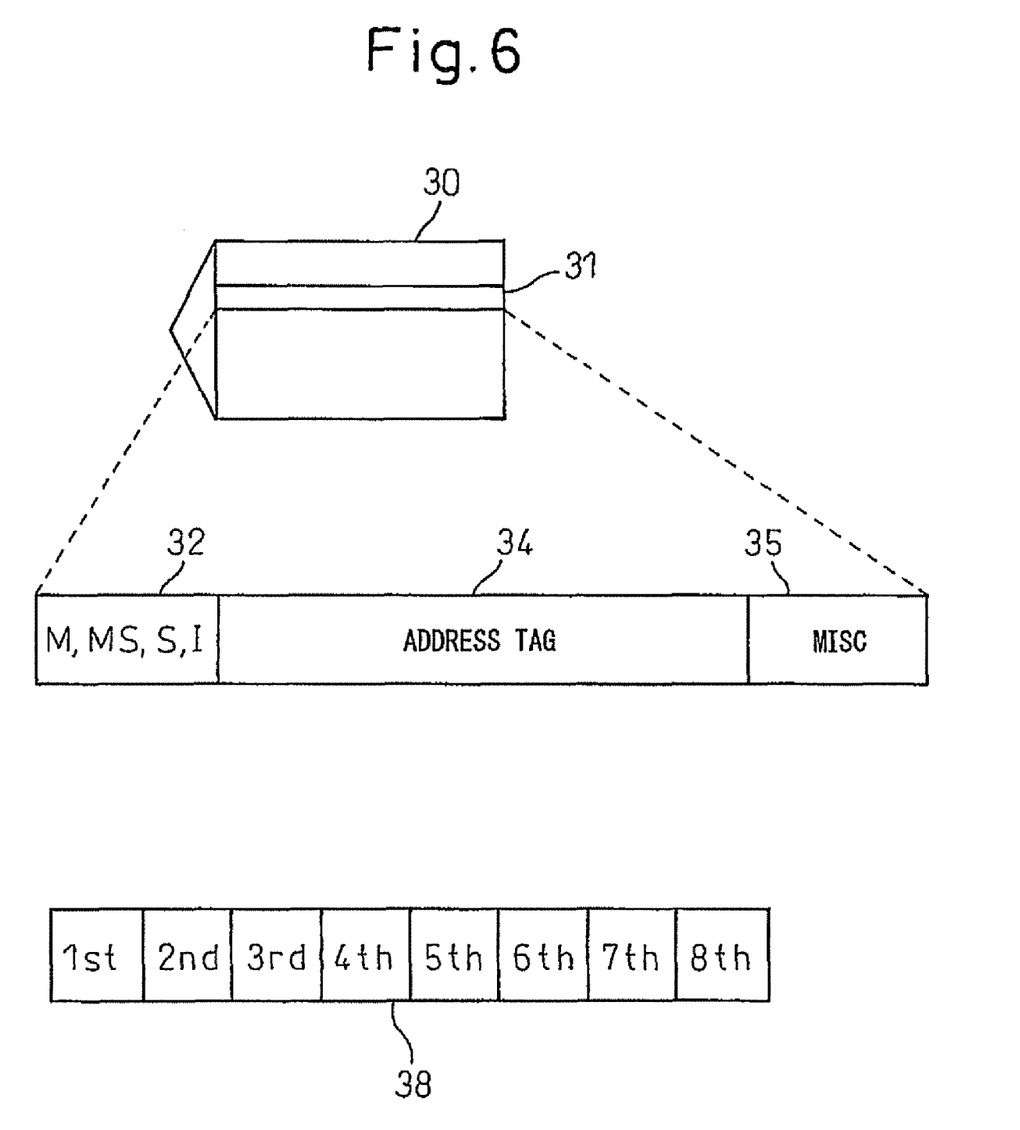
FIG. 6 is a view illustrating a cache tag using a write mask register of a second embodiment of the present embodiments.

FIG. 6 is a view illustrating an example of a cache tag used in a second embodiment. In the second embodiment, partial writable region information is not stored in the tag 30. Instead, there are provided write mask registers 38 specifying the writable regions for each processor core. A write mask register 38 is provided for each processor core and exclusive rights set in the write mask register 38 are common to the corresponding processor core. However, the status MP indicating the partial writable state is registered as the status information 32 of the cache tag 30. One write mask register 38 is provided for one cache tag 30, that is, one processor core. In comparison to when storing information indicating the writable regions for each cache line 31, the number of areas to store the information is significantly reduced.

Thereby, if a processor core repeats a store operation in the same pattern in a certain period, it is sufficient to provide only one register specifying the writable region for each processor core, so the cost can be greatly reduced.

Next, the rewriting processing of partial write state data will be explained. In order to rewrite a partial write state cache line, recovery or merging of the partial write state is preferable. Such a partial write state merge is necessary even when replacing the L2 cache.

Figure 7:
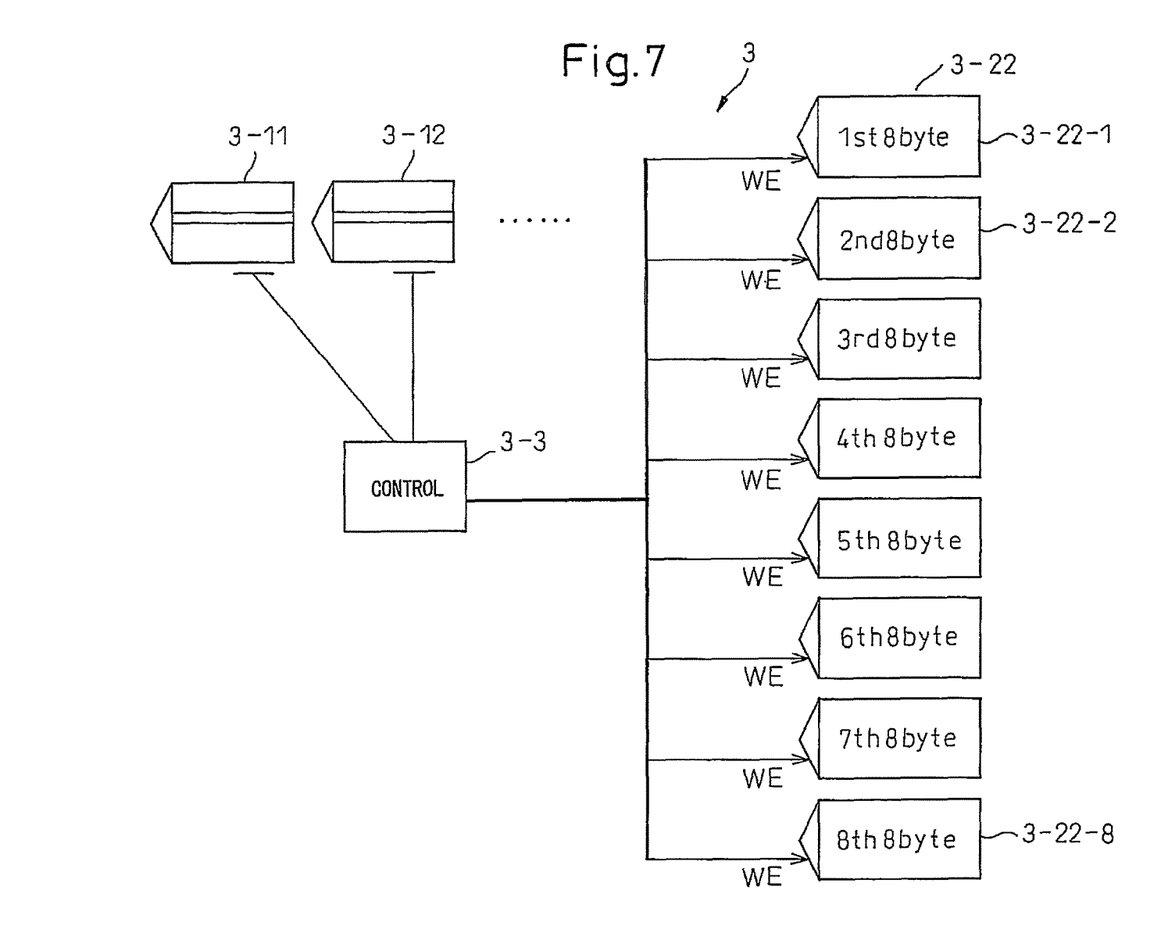
FIG. 7 is a view illustrating a method of recovering data by a partial write according to an embodiment of the present embodiments.

FIG. 7 is a view illustrating a circuit for recovering data written partially in the first embodiment. FIG. 7 illustrates a partial write data recovery circuit provided in an L2 cache 3 of a system which comprises, as illustrated in FIG. 1, an L1 cache provided for each core 1-1 and a L2 cache 3 shared between the cores. For example, the L1 tag copy of the L2 cache sets, with respect to a 64 byte cache line, the 8 byte partial regions, that is, the partial writable regions. Further, the error correction code is 8 bytes. Note that, the information indicating the partial writable region is stored in the cache tag.

As illustrated in FIG. 7, the L2 cache is provided with a partial write control means 3-3 which extracts, from the L1 tag copies 3-11 and 3-12 for the CPU cores, the data of all cores having partial exclusive writes. Further, the first to eighth partial regions 3-2-1 to 3-22-8 of the region in which the L2 cache data 3-22 is stored are assigned the writable signal WE whereby overwriting processing is carried out for each partial region. By doing so, a partial write for each 8 bytes is performed and data is rewritten.

In the first embodiment, the cache tag has a writable region, so the L1 cache tag and the tag copy in the L2 cache control unit also have information indicating the same partial region. Logically, it is sufficient for either one to read the other. In FIG. 7, the tag copy of the L2 cache control unit is read and partial write is executed without change. For example, when L2 has no tag copy and if the L1 cache tag is to be used, it is sufficient to give notice of the partial region and transfer it when transferring data to the L2 control unit.

The second embodiment need not extract partial write region information from the cache tag, but may read data from the mask register. Further, in the second embodiment, when modifying the partial write state of the partial writable region, inconsistency with the partial write state until now and the partial write state after modification occurs, causing data corruption. Accordingly, when the partial write state is updated, it is preferable to temporarily rewrite the contents of the cache to the main memory and low order memory system such as low order cache and make sure that the partial write state does not exist. When rewriting such a partial write state cache line, the data processing illustrated in FIG. 7 is executed. Note that, the cache flush, which flushes the contents of the cache to a low order memory, uses known technology.

In the method of data recovery in FIG. 7, when the cache array or main memory is protected with an error correction code, problems occur if the guard range of the error correction code is not matched to partial write units. In the embodiment, the size of the partial region of the L1 cache was 8 bytes and the error correction code was also 8 bytes, so no problem occurred particularly. In such cases, recovery of data by writing can be realized extremely simply. Further, when partial regions are suitable for the physical division of RAM or the like for example, the method of FIG. 6 is of course effective.

However, for example, a conventional cache assigns ECC check bits with respect to 8 bytes. When handling 4 byte units, when this is applied to a main memory having a block correction function or other large correction mechanism, etc., the ECC check bits nearly double (the necessary bit width falls by the extent of the narrowing of the guard range of one check bit, so to be precise, smaller than doubling). Further, when the partial region is set as 1 byte unit, the size of the ECC check bits with respect to the partial region size becomes larger and may lead to problems.

In this case, if it is attempted to make the guard range of the error correction code match with the partial write units, a surplus memory capacity is necessary. Particularly, use of general purpose main memory modules has become common practice in recent years, so the cost rises significantly if unable to use general purpose products. Further, adding a partial write function when there had been no partial write function will of course increase the physical mounting costs across the entire cache array.

Figure 8:
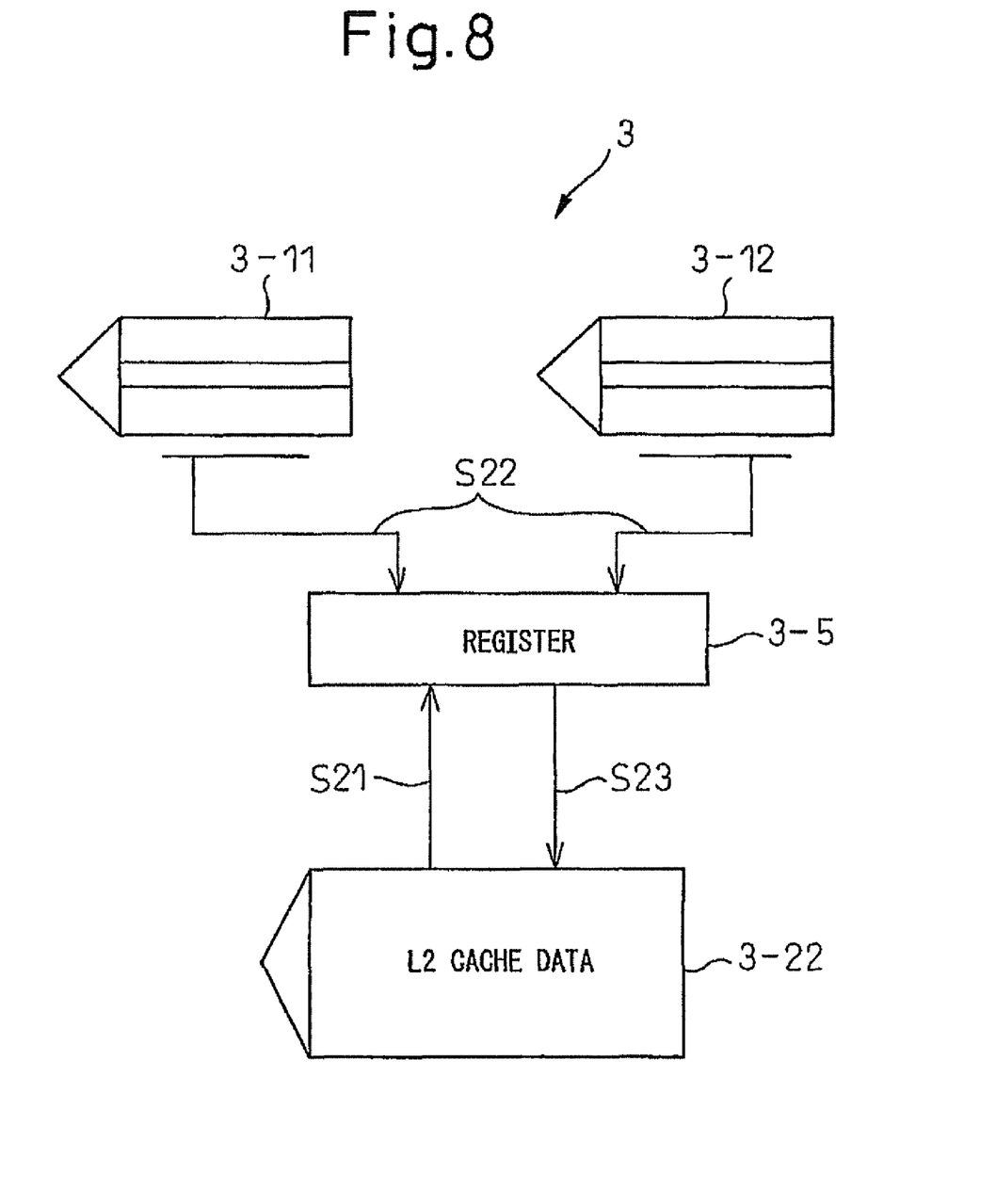
FIG. 8 is a view illustrating a method of recovering data by a merge register according to an embodiment of the present embodiments.

FIG. 8 is a view illustrating a method which can be used when direct partial write to a memory array is difficult due to ECC and other correction mechanism problems. FIG. 8 also is predicated on a system comprising, as illustrated in FIG. 1, an L1 cache provided for each core 1-1 and a L2 cache 3 shared between the cores. FIG. 8 illustrates another method of recovering data provided in the L2 cache 3.

As illustrated in FIG. 8, a merge register 3-5 able to store data of the cache line is arranged in the L2 cache 3. Further, to recover the data, the data before overwriting of the cache line is first read from the region where the L2 cache data 3-22 is stored, then stored in the merge resistor 3-5 (S21).

Next, the partially written cache lines of the L1 cache tags 3-11 and 3-12 are read and the merge register is partially written to (S22). Simultaneously, the cache lines of the L1 cache tags 3-11 and 3-12 are invalidated. Note that, cache tags without partial write are not treated.

Once partial write of the L1 cache tags 3-11 and 3-12 is over, data in the merge register is the collected data, that is, the newest cache line data. Accordingly, the newest cache line data is stored from the register in the region where the L2 cache data 3-22 is stored (S23).

The merging method explained hereof may be applied not only between a core and L2 cache, but similarly between a high order cache and low order cache or a cache and memory. Note that, the routine for storing data in a low order cache or memory or the routine for sending data to a copy back address may be based on the same routine as the normal exclusive type holding state.

Summarizing the advantageous effects of the embodiments, partial exclusive rights may be given for partial writable regions to each processor, so it is possible resolve false sharing with hardware. The effects in large scale systems of the HPC (High Performance Computing) field in particular are significant. Further, depending on the application, use of partial write mask registers can reduce costs. Further, when rewriting data of partial writable regions to a low order memory, the data can be rewritten by performing a direct partial write or this data can be merged and rewritten with the merge register, so any kind of memory configuration can be handled.

All examples and conditional language recited herein are intended for pedagogical purposes to aid the reader in understanding the invention and the concepts contributed by the inventor to furthering the art and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A processor that includes a plurality of processor cores, each of the plurality of processor cores comprising:
   a cache memory that includes a cache line divided into a plurality of partial writable regions;
   a cache tag that registers, as a cache status, a state where an exclusive access right are given to each of the plurality of processor cores by each of the partial writable regions;
   a mask register that stores information of the partial writable regions writable by each of the plurality of processor cores; and
   a processing unit that writes into the cache line of the cache memory based on the cache status registered in the cache tag and the information of the partial writable regions.

2. The processor according to claim 1, further comprising a shared cache memory that is shared by the plurality of processor cores; wherein the processor is connected through the shared cache memory to a main memory.

3. The processor according to claim 2, wherein the cache memory comprises a partial write control unit that writes data written in the partial writable regions of the cache line into the shared cache memory or the main memory by each of the partial writable regions.

4. The processor according to claim 2, further comprising a merge register that merges data written in the partial writable regions and writes the merged data into the shared cache memory or the main memory.

5. The processor according to claim 1, wherein data stored in a region where an exclusive access right is given to a processor core is written to the shared cache memory or the main memory by the partial writable region of the cache line when the information of the partial writable regions stored in the mask register is changed.

6. An information processing device that includes a plurality of processors, each of the plurality of processors comprising:
   a cache memory that includes a cache line divided into a plurality of partial writable regions;
   a cache tag that registers, as a cache status, a state where an exclusive access right are given to each of the plurality of processor cores by each of the partial writable regions;
   a mask register that stores information of the partial writable regions writable by each of the plurality of processor cores; and
   a processing unit that writes into the cache line of the cache memory based on the cache status registered in the cache tag and the information of the partial writable regions.

7. The information processing device according to 6, further comprising a main memory that is shared by the plurality processors.

8. The information processing device according to 7, wherein the main memory comprises a partial write control unit that writes data written in the partial writable regions of the cache line into the main memory by each of the partial writable regions.

9. The information processing device according to 7, further comprising a merge register that merges data written in the partial writable regions and writes the merged data into the main memory.

10. The information processing device according to 6, wherein data stored in a region where an exclusive access right is given to a processor is written to the main memory by the partial writable region of the cache line when the information of the partial writable regions stored in the mask register is changed.

11. A method for controlling a processor that includes a plurality of processor cores, each of the plurality of processor cores comprising a cache memory that includes a cache line divided into a plurality of partial writable regions, the method comprising:
   registering in a cache tag of each of the plurality of processor cores, as a cache status, a state where an exclusive access right are given to each of the plurality of processor cores by each of the partial writable regions;
   storing information of the partial writable regions writable by each of the plurality of processor cores in a mask register of each of the plurality of processor cores; and
   writing, by a processing unit of each of the plurality of processor cores, into the cache line of the cache memory based on the cache status registered in the cache tag and the information of the partial writable regions.

12. The method according to claim 11, wherein the processor includes a shared cache memory that is shared by the plurality of processor cores and is connected through the shared cache memory to a main memory.

13. The method according to claim 12, further comprising writing, by a partial write control unit of the cache memory, data written in the partial writable regions of the cache line into the shared cache memory or the main memory by each of the partial writable regions.

14. The method according to claim 12, further comprising merging, by a merge register of the processor, data written in the partial writable regions and writes the merged data into the shared cache memory or the main memory.

15. The method according to claim 11, further comprising writing data stored in a region where an exclusive access right is given to a processor core to the shared cache memory or the main memory by the partial writable region of the cache line when the information of the partial writable regions stored in the mask register is changed.

\* \* \* \* \*